July 15, 1941.  E. L. RIETZ  2,249,637
WHEEL
Filed April 15, 1939
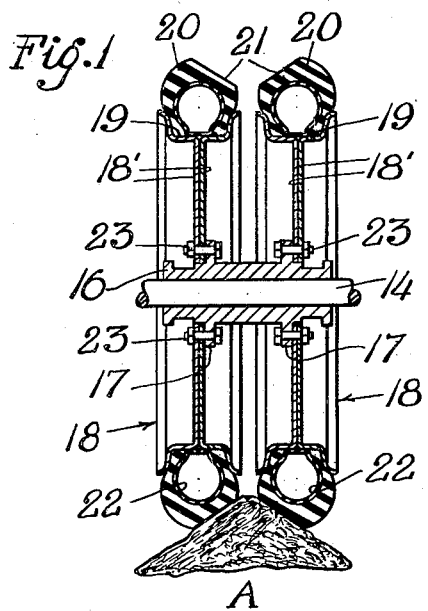
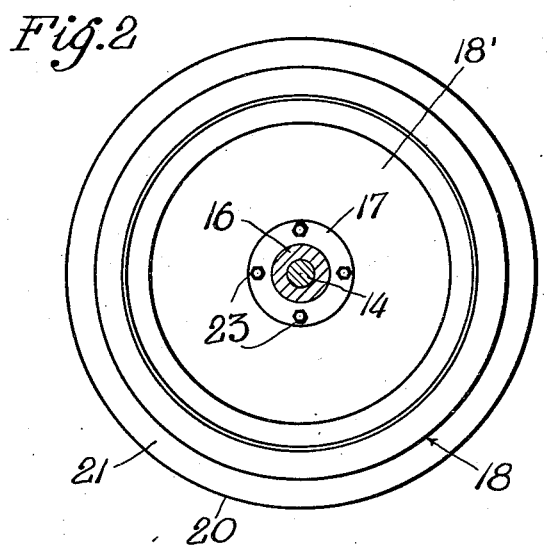
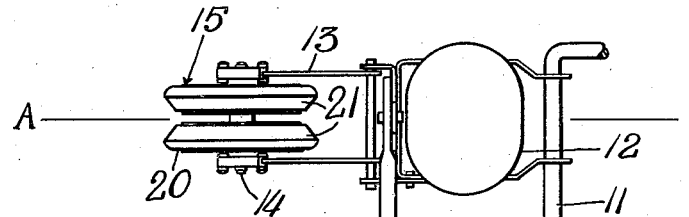
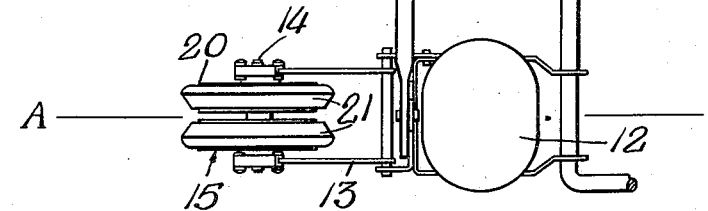
Inventor
Edward L. Rietz
By Paul O. Pippel
Atty.

Patented July 15, 1941

2,249,637

UNITED STATES PATENT OFFICE 2,249,637

WHEEL

Edward L. Rietz, Riverside, Ill., assignor to International Harvester Company, a corporation of New Jersey Application April 15, 1939, Serial No. 268,113

9 Claims. (Cl. 97—56)

This invention relates to a wheel and tire, and more particularly to a rubber tire having a tread portion formed as the section of a cone, the tire being adapted for use on a wheel on an agricultural implement wherein the wheel is run at an angle to the vertical, in which case the tread is flat on the ground, or wherein the wheel is operated in a vertical plane, in which case the tread is at an angle to the ground. More particularly the invention contemplates the arrangement of a pair of such tires on a wheel so that the wheel may be used as a planter press-wheel having flexible tread portions.

The principal object of the invention is to provide a rubber tire having an annular sloping tread portion.

An important object is to provide an improved press- or covering-wheel structure having a pair of rubber tires mounted thereon in axially spaced relation, each tire having an annular sloping tread portion.

Another object is to provide a press-wheel structure having a unitary hub carrying a pair of wheel members adapted respectively to carry a pair of rubber tires.

These and other desirable objects are achieved in one preferred embodiment of the invention described hereinafter with reference to the accompanying sheet of drawing, in which:

Figure 1 is a sectional view through the improved wheel;

Figure 2 is a face view of the wheel; and,

Figure 3 is a diagrammatic plan view of a conventional planter illustrating the mounting of the improved wheels thereon.

The planter chosen for the purpose of illustration is of conventional construction and is indicated in the drawing at 10. The planter comprises the usual planter frame 11 which may be connected to a tractor or other vehicle. The frame 11 carries a pair of transversely spaced hoppers 12, from which seed is distributed in the well known manner along spaced rows A. The frame 11 is provided rearwardly of the hoppers 12 with a pair of transversely spaced wheel-supporting structures 13 respectively alined with the hoppers. Each supporting structure 13 carries an axle 14 on which is journaled a press- or covering-wheel structure 15. As the planter is moved forwardly over the ground, these wheels serve in the usual manner to press the soil at each side of the hills of planted seed respectively along the rows A.

Each improved wheel structure comprises, as best shown in Figure 1, a unitary hub 16 journaled on the axle 14. The hub is provided with a pair of axially spaced flanges 17 to each of which is secured a wheel member in the form of disks 18 having annular tire-carrying portions 19 disposed in axially spaced relation, leaving thereby an annular space between the wheel members. Each wheel member 18 carries in its annular tire-carrying portion, a flexible tire 20 which is preferably formed as a hollow rubber annulus having an annular sloping tread portion 21 the section of a cone formed about an axis passing through the common center of the wheel and tire. The two tires are identical and are mounted symmetrically on the wheel structure with the sloping tread portions 21 sloping radially inwardly toward each other, the opposite inner walls of each tire being axially spaced apart.

Each tire 20 is provided with an inner tube 22 which may be omitted, if desired. The object of the wheel structure is to provide a press-wheel having the dual sloping tread portions 21 formed on the peripheries of a pair of axially spaced tires of the pneumatic or flexible type. The structure serves to provide an improved press-wheel which functions in a manner improved over that of the ordinary steel tired press-wheel. The rubber tires, being flexible, do not accumulate soil and are consequently substantially clean at all times during operation. The use of the rubber tires on the planter also permits the same to be operated efficiently at higher speeds in accordance with the increased use of rubber tires and higher speeds in tractors and other draft vehicles.

As shown in Figure 1, the particular wheel structure chosen for the purpose of illustration includes the wheel members 18 as being formed of two symmetrical disks 18' which are secured to the flange 17 by a plurality of bolts 23. This construction permits easy removal of the tires 20 from the wheel members 18 and each tire 20 may be readily removed by detaching the respective wheel member 18 and separating the disk parts 18'. This provision is desirable because of the increased depth of the side walls of the disk parts 18' that comprise the tire-carrying portion 19, these side walls being extended a considerable distance radially to afford comparative rigidity to the side walls of the respective tires 20. This rigidity is desirable in maintaining proper alinement of the tires and for permitting flexibility of the tires in the annular portions comprising the sloping treads 21.

It will be seen from the foregoing description that the improved press-wheel structure is provided with dual symmetrical tread portions, each in the form of the section of a cone converging inwardly toward an annular space between the treads. This annular space aids in keeping the flexible treads clean.

It will, of course, be understood that various changes may be made in the form, details, arrangement, and proportions of the parts, without departing from the scope of the invention, which generally stated, consists in a rubber tire mounted on a wheel and capable of carrying out the objects above set forth, in the novel parts and combinations of parts disclosed and defined in the appended claims.

What is claimed is:

1. A planter press-wheel comprising a wheel having a unitary hub structure, a pair of wheel members carried by the hub in axially spaced relation, each member including an annular tire-carrying rim, and a pair of rubber tires carried respectively by the rims, each tire having an annular, sloping tread portion the section of a cone, said tires being respectively carried on the wheel members with the tread portions sloping radially inwardly toward each other to adapt the treads for pressing opposite sides of planted hills.

2. A planter press-wheel comprising a wheel having a pair of axially spaced annular tire-carrying rims, and a pair of rubber tires carried respectively by said rims, each tire being formed with an annular sloping tread the section of a cone, the tires being mounted on the rims with their treads sloping radially inwardly toward each other to adapt the treads for pressing opposite sides of planted hills.

3. A rubber tired wheel comprising a wheel having a pair of axially spaced tire-carrying rims, and a pair of tires formed of flexible material carried respectively by the rims, each tire being substantially hollow and having a sloping periphery to form an annular tread the section of a cone, said tires being mounted on the rims with their treads sloping radially inwardly toward each other to adapt the wheel for operating over ground where the ground surface and the wheel axis are non-parallel.

4. A rubber-tired wheel comprising a wheel and dual pneumatic rubber tires carried thereby, each tire having an annular sloping tread portion, said tires being mounted on the wheel with their treads sloping radially inwardly toward each other to adapt the wheel for operating over ground where the ground surface and the wheel axis are non-parallel.

5. A wheel having dual pneumatic tires formed respectively with annular sloping treads to adapt the wheel for operating over ground where the ground surface and the wheel axis are non-parallel.

6. A rubber-tired wheel having a pair of axially spaced, symmetrical annular treads, each the section of a cone and converging inwardly to adapt the wheel for operating over ground where the ground surface and the wheel axis are non-parallel.

7. A rubber-tired wheel having a pair of annular, rubber tread portions disposed in axially spaced relation and having thereby an annular space therebetween, each tread being formed as the section of a cone and sloped toward the annular space to adapt the wheel for operating over ground where the ground surface and the wheel axis are non-parallel.

8. A wheel comprising a wheel member having a pair of axially spaced annular tire-carrying rims, and a pair of flexible tires carried respectively by said rims, each tire being formed with an annular sloping tread the section of a cone, the tires being mounted on the rims in axially spaced relation and having thereby an annular space therebetween, the annular treads sloping toward said space to adapt the wheel for operating over ground where the ground surface and the wheel axis are non-parallel.

9. A rubber-tired press-wheel comprising a central wheel structure including a pair of annular, axially spaced tire-carrying rims, each rim including spaced, radially extending side walls providing a deep center well, and a pair of flexible tires carried respectively by the rim center wells, the side walls of each rim extending a considerable radial distance at the sides of the respective tire for increasing the rigidity of the side portions of the tire, each tire being formed with an annular sloping tread portion of comparatively greater flexibility than the tire side portions, said tires being mounted in the rims with the tread portions sloping radially inwardly toward each other to adapt the treads for pressing opposite sides of planted hills.

EDWARD L. RIETZ.